US010639586B2

(12) United States Patent
Davidian et al.

(10) Patent No.: US 10,639,586 B2
(45) Date of Patent: May 5, 2020

(54) METHOD AND SYSTEM FOR REDUCING CO2 EMISSIONS FROM INDUSTRIAL PROCESSES

(71) Applicant: Dow Global Technologies LLC, Midland, MI (US)

(72) Inventors: Thomas Davidian, Terneuzen (NL); Steven Corthals, Terneuzen (NL); Cornelis Biesheuvel, Terneuzen (NL); Matthijs Ruitenbeek, Terneuzen (NL); Andrzej Malek, Midland, MI (US); Peter E. Groenendijk, Terneuzen (NL); Garmt R. Meima, Terneuzen (NL)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/776,928

(22) PCT Filed: Nov. 14, 2016

(86) PCT No.: PCT/US2016/061794
§ 371 (c)(1),
(2) Date: May 17, 2018

(87) PCT Pub. No.: WO2017/087307
PCT Pub. Date: May 26, 2017

(65) Prior Publication Data
US 2018/0326352 A1 Nov. 15, 2018

Related U.S. Application Data

(60) Provisional application No. 62/256,459, filed on Nov. 17, 2015.

(51) Int. Cl.
*C01B 3/02* (2006.01)
*B01D 53/62* (2006.01)
(Continued)

(52) U.S. Cl.
CPC ......... *B01D 53/75* (2013.01); *B01D 53/1418* (2013.01); *B01D 53/1425* (2013.01);
(Continued)

(58) Field of Classification Search
CPC ................ B01D 53/75; B01D 53/1418; B01D 53/8653; B01D 53/1425; B01D 53/343;
(Continued)

(56) References Cited

U.S. PATENT DOCUMENTS 5,324,335 A 6/1994 Benham et al.
8,278,362 B2 10/2012 Wiesner
(Continued)

OTHER PUBLICATIONS

International Search Report & Written Opinion for related PCT Application PCT/US2016/061794, dated Jan. 30, 2017 (13 pgs).
(Continued)

*Primary Examiner* — Huy Tram Nguyen
(74) *Attorney, Agent, or Firm* — Brooks, Cameron & Huebsch, PLLC (57) ABSTRACT

A method and an integrated system for reducing $CO_2$ emissions in industrial processes. The method and integrated system (100) capture carbon dioxide ($CO_2$) gas from a first gas stream (104) with a chemical absorbent to produce a second gas stream (106) having a higher concentration of carbon monoxide (CO) gas and a lower concentration of $CO_2$ gas as compared to first gas stream. The CO gas in the second gas stream is used to produce $C_5$ to $C_{20}$ hydrocarbons in an exothermic reaction (108) with hydrogen ($H_2$) gas (138). At least a portion of the heat generated in the exothermic reaction is used to regenerate the chemical absorbent with the liberation of the $CO_2$ gas (128) captured from the first gas stream. Heat captured during the exothermic reaction can, optionally, first be used to generate electricity, wherein the heat remaining after generating electricity is used to thermally regenerate the chemical absorbent.

18 Claims, 2 Drawing Sheets

(51) Int. Cl.
  *B01D 53/75* (2006.01)
  *B01D 53/14* (2006.01)
  *C10G 2/00* (2006.01)
  *B01D 53/34* (2006.01)
  *B01D 53/86* (2006.01)

(52) U.S. Cl.
  CPC ....... *B01D 53/1475* (2013.01); *B01D 53/343* (2013.01); *B01D 53/62* (2013.01); *B01D 53/8653* (2013.01); *C01B 3/02* (2013.01); *C10G 2/30* (2013.01); *C10G 2/32* (2013.01); *C10G 2/332* (2013.01); *B01D 2252/20447* (2013.01); *B01D 2252/20484* (2013.01); *B01D 2252/20489* (2013.01); *B01D 2252/30* (2013.01); *B01D 2256/16* (2013.01); *B01D 2256/20* (2013.01); *B01D 2256/22* (2013.01); *B01D 2257/502* (2013.01); *B01D 2257/504* (2013.01); *B01D 2258/0283* (2013.01); *B01D 2259/65* (2013.01); *C01B 2203/04* (2013.01); *C01B 2203/043* (2013.01); *C01B 2203/049* (2013.01); *C01B 2203/0465* (2013.01); *C01B 2203/0485* (2013.01); *C01B 2203/062* (2013.01); *C10G 2400/02* (2013.01); *Y02C 10/04* (2013.01); *Y02C 10/06* (2013.01)

(58) Field of Classification Search
  CPC ................ B01D 53/1475; B01D 53/62; B01D 2256/16; B01D 2256/22; B01D 2259/65; B01D 2258/0283; B01D 2257/504; B01D 2257/502; B01D 2256/20; B01D 2252/30; B01D 2252/20489; B01D 2252/20484; B01D 2252/20447; C10G 2/32; C10G 2/332; C10G 2/30; C10G 2400/02; C01B 3/02; C01B 2203/049; C01B 2203/0485; C01B 2203/0465; C01B 2203/043; C01B 2203/04; C01B 2203/062; Y02C 10/04; Y02C 10/06
  USPC ........................................................ 422/187
  See application file for complete search history.

(56) References Cited

U.S. PATENT DOCUMENTS

| | | | |
|---|---|---|---|
| 2004/0180973 A1 | 9/2004 | Hershkowitz | |
| 2013/0137783 A1* | 5/2013 | Kumar | C10G 2/00 518/702 |
| 2014/0105809 A1* | 4/2014 | Okumura | B01D 53/04 423/437.1 |
| 2015/0005398 A1* | 1/2015 | Chakravarti | C10K 1/004 518/702 |
| 2015/0122243 A1 | 5/2015 | Galloway | |
| 2015/0126625 A1* | 5/2015 | Iyer | C10G 47/00 518/700 |

OTHER PUBLICATIONS

International Preliminary Report on Patentability for related PCT Application PCT/US2016/061794, dated May 31, 2018 (8 pgs).

\* cited by examiner

METHOD AND SYSTEM FOR REDUCING CO2 EMISSIONS FROM INDUSTRIAL PROCESSES

This application is a National Stage Application under 35 U.S.C. § 371 of International Application Number PCT/US2016/061794, filed Nov. 14, 2016 and published as WO 2017/087307 on May 26, 2017, which claims the benefit to U.S. Provisional Application 62/256,459, filed Nov. 17, 2015, the entire contents of which are incorporated herein by reference in its entirety.

TECHNICAL FIELD

The present disclosure relates generally to industrial processes, and more particularly to reducing $CO_2$ gas emission from effluent gases from industrial processes.

BACKGROUND

A variety of industrial processes generate effluent gases that contain carbon dioxide ($CO_2$) and other products containing carbon, such as carbon monoxide (CO). Examples of such effluent gases include those from the steel manufacturing industry (e.g., blast furnace gas, oxygen converter gas, or coke oven gas). These effluent gases have a $CO_2$ gas concentration ranging from about 10 to 50 volume percent (vol. %) and a CO gas concentration ranging from about 10 to 80 vol. %. Effluent gases can also contain other gases such as hydrogen, hydrocarbons and/or inert gases such as nitrogen in quantities up to about 50 vol. %. Flue gases are an example of effluent gases.

Before being emitted in to the atmosphere, CO gas in effluent gas needs to be converted to $CO_2$ gas because of its toxicity. A combustion process can be used to produce the $CO_2$ gas along with heat that can be used in a variety of processes. High concentrations of $CO_2$ gas and nitrogen gas, however, significantly reduce the caloric concentration of the CO gas present in the effluent gas, resulting in a decreased incentive to use the effluent gas. Nevertheless, toxic/harmful CO gas must be converted to $CO_2$ gas before being emitted. Hence, effluent gas is often combusted to convert the CO gas to additional $CO_2$ gas with no attempt to recover the heat generated in electrical power production.

Regardless of the process, combusting the effluent gas or using the effluent gas in an energy producing process generates additional $CO_2$ gas that is emitted into the atmosphere. In some regions, Europe for example, industries emitting large amounts of $CO_2$ gas are taxed and/or are required to buy $CO_2$ trading rights based on their use of $CO_2$ gas producing feedstock, often rendering such energy producing processes uneconomical.

In an effort to minimize its release, $CO_2$ gas can be captured and stored or used in one or more industrial processes. For example, industrial processes exist where $CO_2$ gas is used as a feedstock. These applications, however, often require concentrated and highly purified $CO_2$ gas. Examples of these industrial processes include the cement industry, the beverage industry (e.g., in the production of carbonated beverages), for syngas generation via the so-called dry reforming process or in combination with steam reforming, or in combination with steam reforming and partial oxidation via the so-called tri-reforming, or for use in producing methanol by chemical conversion with $H_2$. The $CO_2$ gas produced in the combustion processes, however, is typically not concentrated and/or pure enough to be used as a feedstock in such applications.

Processes that sequester $CO_2$ gas from effluent gas also generally require an energy input to an extent that overall more $CO_2$ is produced than is captured. In other words, $CO_2$ conversion and/or sequestration processes are often thermodynamically unfavorable, which require energy input with extra $CO_2$ formation. For example, $CO_2$ absorption by amine-based solutions is known to be very efficient and selective to absorb $CO_2$ gas. However, the recovery of $CO_2$ from such solutions, also termed as the regeneration step, is highly endothermic. Therefore, this regeneration process requires energy which gives rise to additional energy consumption and consequently additional $CO_2$ gas emissions.

There exists, therefore, a need for improvements in reducing $CO_2$ emission from effluent gas containing CO and $CO_2$ gases.

SUMMARY

The present disclosure provides both a method and an integrated system for helping to reduce $CO_2$ emissions from effluent gases produced in industrial processes, while also producing a valuable hydrocarbon feedstock. The method includes capturing carbon dioxide ($CO_2$) gas from a first gas stream with a chemical absorbent, wherein the first gas stream includes carbon monoxide (CO) gas and $CO_2$ gas, to produce a second gas stream having a higher concentration of CO gas and a lower concentration of $CO_2$ gas as compared to first gas stream; producing hydrocarbons with hydrogen ($H_2$) gas and the CO gas in the second gas stream from a Fischer-Tropsch reaction, wherein the Fischer-Tropsch reaction produces heat; and using at least a portion of the heat produced in the Fischer-Tropsch reaction to regenerate the chemical absorbent by liberation of the $CO_2$ gas captured from the first gas stream.

The first gas stream has a mole ratio of the CO gas to the $CO_2$ gas (mole CO gas:mole $CO_2$ gas) from 0.5:1 to 10:1, where the first gas stream can also have a mole ratio of the CO gas to the $CO_2$ gas (mole CO gas:mole $CO_2$ gas) of 0.5:1 to 2.5:1. Producing hydrocarbons from the Fischer-Tropsch reaction includes producing $C_5$ to $C_{20}$ hydrocarbons, where the $H_2$ gas from a $H_2$ gas source and the CO gas and the $H_2$ gas in the second gas stream used to produce the $C_5$ to $C_{20}$ hydrocarbons from the Fischer-Tropsch reaction are reacted in a molar ratio of $H_2$ gas to CO gas (mole $H_2$ gas:mole CO gas) in the range of 1:1 to 3:1. As mentioned, the Fischer-Tropsch reaction produces heat, a portion of which can be used to regenerate the chemical absorbent by liberation of the $CO_2$ gas captured from the first gas stream. The heat produced during the Fischer-Tropsch reaction can also be used to generate electricity, wherein waste heat from generating the electricity is used as the portion of the heat produced during the Fischer-Tropsch reaction to regenerate the chemical absorbent.

The integrated system of the present disclosure includes, among other things, a $CO_2$ absorption system having an inlet for a first gas stream having at least CO gas and $CO_2$ gas, wherein the $CO_2$ absorption system captures $CO_2$ gas from the first gas stream with a chemical absorbent to produce a second gas stream having higher concentration of CO gas and a lower concentration of $CO_2$ gas as compared to first gas stream; a Fischer-Tropsch reactor connected to a source of hydrogen ($H_2$) gas and to the $CO_2$ absorption system to receive the second gas stream, wherein the Fischer-Tropsch reactor operates to catalytically produce hydrocarbons from a Fischer-Tropsch reaction with the $H_2$ gas from the $H_2$ gas source and the CO gas and the $H_2$ gas from the second gas stream, wherein the Fischer-Tropsch reaction produces heat;

a heat exchanger connected to the Fischer-Tropsch reactor to capture heat produced during the Fischer-Tropsch reaction; and a $CO_2$ desorption system connected to both the $CO_2$ absorption system and the heat exchanger, wherein at least a portion of the heat captured by the heat exchanger connected to the Fischer-Tropsch reactor thermally regenerates the chemical absorbent in the $CO_2$ desorption system to liberate the captured $CO_2$ gas. The Fischer-Tropsch reactor can operate with a cobalt-catalyst at a temperature in a range of 200° C. to 260° C. and a pressure in a range of 0.5 MPa to 5 MPa. In an additional embodiment, the heat captured by the heat exchanger of the Fischer-Tropsch reactor is first used in generating electricity, wherein waste heat remaining after generating the electricity is used to thermally regenerate the chemical absorbent in the $CO_2$ desorption system.

DETAILED DESCRIPTION

Concern over man-made emissions of greenhouse gases leading to harmful climate change is growing. Carbon dioxide ($CO_2$) has been identified as one of the main greenhouse gases produced and is for example released in effluent gases from industrial processes. Such industrial processes include, but are not limited to fossil fuel energy facilities, steel making facilities, biomass energy facilities, natural gas processing facilities, synthetic fuel plants, refineries, petrochemical production plants, and fossil fuel-based hydrogen production plants. In some cases these effluent gasses contain also CO, such is the cases for example in effluent gasses from the steel industry. Before being emitted in to the atmosphere, CO gas in effluent gas needs to be converted to $CO_2$ gas because of its toxicity. A combustion process can be used to produce the $CO_2$ gas along with heat that can be used in a variety of processes.

To prevent the release of $CO_2$ gas a variety of capture technologies have been proposed. Of these capture technologies chemical absorption is thought to be the best suited for capturing $CO_2$ gas from the effluent gases of these industrial processes. Chemical absorption, however, requires energy to regenerate the $CO_2$-enriched chemical absorbents. Often, the energy necessary to regenerate the chemical absorbents also produces $CO_2$ gas, which detracts from the overall efficiency and effectiveness of capturing the $CO_2$ gas.

In an effort to address this issue, the present disclosure provides both a method and an integrated system for helping to reduce $CO_2$ emissions from effluent gases produced in industrial processes, while also producing a valuable hydrocarbon product that can replace carbon-based products from fossil origin, i.e. oil or gas. The method and integrated system discussed herein capture $CO_2$ gas from a first gas stream with a chemical absorbent to produce a second gas stream having a higher concentration of CO gas and a lower concentration of $CO_2$ gas as compared to the first gas stream. The CO gas in the second gas stream along with hydrogen ($H_2$) gas is used to produce hydrocarbons in a Fischer-Tropsch reaction. The formation of hydrocarbons intrinsically saves $CO_2$ gas emissions as the CO gas is converted to valuable products instead of undergoing combustion to produce more $CO_2$ gas. At least a portion of the heat generated in the Fischer-Tropsch reaction is used to regenerate the $CO_2$-enriched chemical absorbent with the liberation of the $CO_2$ gas captured from the first gas stream. The heat captured during the Fischer-Tropsch reaction can also, optionally, be used first to generate electricity, where the heat remaining after generating electricity is then used to thermally regenerate the $CO_2$-enriched chemical absorbent. So, the present disclosure surprisingly provides for the production of valuable hydrocarbons from a CO-containing waste stream that would normally be wasted while simultaneously capturing $CO_2$ gas at a low to zero net energy input.

As used herein, the term "effluent gas" or "effluent gases" means any post-process gas containing at least $CO_2$ gas and CO gas. Examples of effluent gas or effluent gases include flue gases, exhaust gases, discharge gases and/or process gases from an industrial process, such as those described herein.

As used herein, a "line" as associated with the integrated system indicates a pipe or conduit sufficiently sized and of proper material to transport the fluid (e.g., liquid or gas) indicated to be moving within the line. It is understood that one or more pumps and/or compressors or other known devices for moving the fluid are also associated with the line and the components of the integrated system discussed herein. Such devices, however, are not illustrated so as to allow the figures to better show the present disclosure. Arrowheads shown on the "lines" seen in the Figures of the integrated system indicate the direction of fluid flow.

As used herein, "a," "an," "the," "at least one," and "one or more" are used interchangeably. The terms "comprises" and variations thereof do not have a limiting meaning where these terms appear in the description and claims. The term "and/or" means one, more than one, or all of the listed elements. As used herein, the term "about" may not be limited to the precise value specified. In at least one instance, the variance indicated by the term "about" can be determined with reference to the precision of the measuring instrumentation. Also herein, the recitations of numerical ranges by endpoints include all numbers subsumed within that range (e.g., 1 to 5 includes 1, 1.5, 2, 2.75, 3, 3.80, 4, 5, etc.).

In the following detailed description of the present disclosure, reference is made to an accompanying drawing that forms a part hereof, and in that is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, chemical and/or structural changes may be made without departing from the scope of the present disclosure.

The figures herein follow a numbering convention in that the first digit corresponds to the drawings figure number and the remaining digits identify an element or component in the drawing. Similar elements or components between different figures may be identified by the use of similar digits. For example, 110 may reference element "10" in FIG. 1, and a similar element may be referenced as 210 in FIG. 2. As will be appreciated, elements shown in the various embodiments herein can be added, exchanged, and/or eliminated so as to provide a number of additional embodiments of the present disclosure. In addition, as will be appreciated the proportion and the relative scale of the elements provided in the figures are intended to illustrate the embodiments of the present invention, and should not be taken in a limiting sense.

Figure 1:
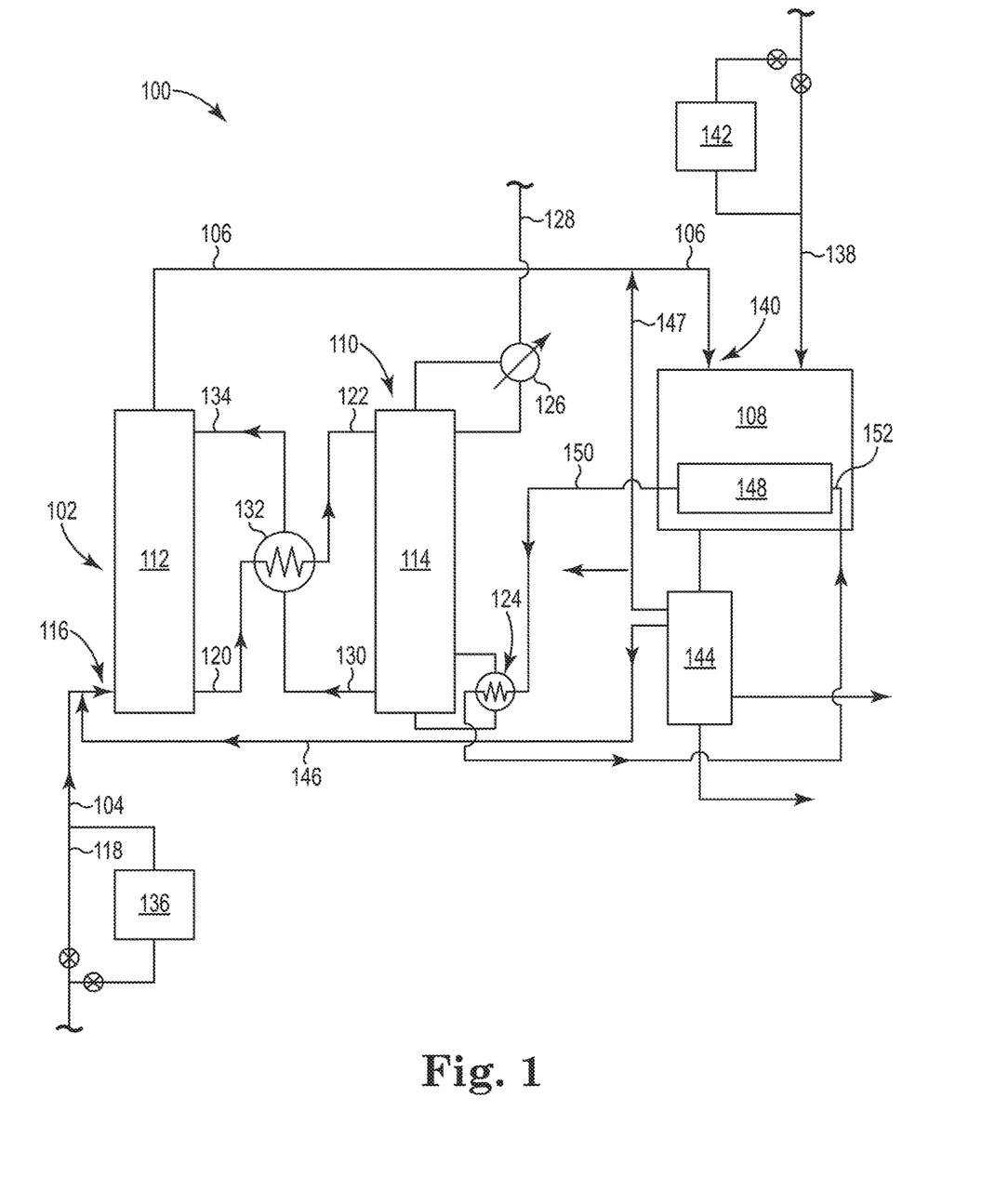
FIG. 1 provides an illustration of an integrated system according to the present disclosure.

Referring now to FIG. 1, there is illustrated an embodiment of an integrated system 100 according to the present disclosure. The integrated system 100 includes two major processes that are integrated in such a way to both capture $CO_2$ gas using a chemical absorbent and to thermally regenerate the chemical absorbent using heat captured in an exothermic process (e.g., a Fischer-Tropsch reaction) that converts the CO gas and $H_2$ gas into hydrocarbons. As illustrated in FIG. 1, the integrated system 100 includes a $CO_2$ absorption system 102 that operates to absorb $CO_2$ gas from the first gas stream 104 using a chemical absorbent, thereby producing the second gas stream 106 having a higher concentration of CO gas and a lower concentration of $CO_2$ gas as compared to first gas stream 104. As will be discussed more fully herein, the second gas stream 106 is used in a Fischer-Tropsch reactor 108, where CO gas in the second gas stream 106 is reacted with the $H_2$ gas from both the second gas stream 106 and stream 138 to produce both hydrocarbons and heat from the exothermic Fischer-Tropsch reaction. The heat generated in the Fischer-Tropsch reactor 108 is used to regenerate the chemical absorbent in a $CO_2$ desorption system 110, as will be described herein.

A variety of $CO_2$ gas capture technologies exist that could be used with the $CO_2$ absorption system 102 and a $CO_2$ desorption system 110. Such $CO_2$ gas capture technologies can include physical adsorption, physical absorption, membrane technologies and/or chemical absorption to capture $CO_2$ gas from the first gas stream 104. Of these technologies, the use of chemical absorption using a chemical absorbent is preferred because it is the most applicable to the volume, pressure and temperature of the $CO_2$ gas present in effluent gases from the industrial process described herein. As mentioned, however, the use of a chemical absorbent poses some drawbacks, most notably a high energy consumption in its regeneration in the $CO_2$ desorption system. The present disclosure uses the Fischer-Tropsch reactor 108 to provide at least the necessary energy to regenerate the chemical absorbent in the $CO_2$ desorption system 110.

As illustrated in FIG. 1, the $CO_2$ absorption system 102 includes an absorption column 112 (also referred to as a scrubber or an absorber) for capturing $CO_2$ gas from the first gas stream 104 with the chemical absorbent. FIG. 1 also illustrates the $CO_2$ desorption system 110 having a desorption column 114 (also referred to as a stripper) for regenerating the chemical absorbent and releasing the $CO_2$ gas captured from the first gas stream 104. The $CO_2$ absorption system 102 and the $CO_2$ desorption system 110 operates to capture $CO_2$ gas from the first gas stream 104 with the chemical absorbent in the absorption column 112 to produce the second gas stream 106 having higher concentration of CO gas and a lower concentration of $CO_2$ gas as compared to first gas stream 104.

A variety of compounds and solutions thereof can be used for the chemical absorbent. For example, the chemical absorbent can be an amine based compound. Specific examples of such an amine based compound can include, but are not limited to, an amine, an alkanolamine, an ionic liquid and/or a piperazine. Preferably, the alkanolamine can include, but is not limited to, primary, secondary and/or ternary amines containing at least one OH and amine group. Examples of such alkanolamines include those selected from the group consisting of monoethanolamine (MEA), 2-dipropanolamine (DIPA), diethanolamine (DEA), triethanolamine (TEA), N-methyldiethanolamine (MDEA), diglycolamine (DGA), 2-amino-2-methyl-1-propanol (AMP) and combinations thereof.

Preferably, an aqueous alkanolamine solution is used as the chemical absorbent in the $CO_2$ absorption system 102. The aqueous alkanolamine solution includes a solution of one or more of the alkanolamines provided herein and water. Preferably, the aqueous alkanolamine solution used in the $CO_2$ absorption system 102 has a concentration of 20 weight percent (wt. %) to 55 wt. % based on the total weight of the aqueous alkanolamine solution. Finally, because of various properties and advantages of the various chemical absorbents provided herein, a mixture of two or more of the chemical absorbents may also be used to enhance $CO_2$ gas capture efficiency in the absorption column 112.

As understood by one skilled in the art, the volume, composition, $CO_2$ concentration, temperature, along with other parameters of the first gas stream 104 help to determine the function, configuration, number, size and operational parameters for each of the absorption column 112 and the desorption column 114. In general, the absorption column 112 can operate at a pressure of about 100 kPa and the temperatures in the ranges of 40° C. to 60° C. Alternatively, the absorption column 112 can operate at a pressure in a range of 5 kPa to 8400 kPa, with temperatures in the ranges of 15° C. to 65° C. Specific examples operating pressures for the absorption column 112 can also include 500 kPa to 4000 kPa with temperatures in the ranges of 25° C. to 50° C. The exact pressure and temperature for operating the absorption column 112 can depend on the exact composition of the chemical absorbent(s) used. The desorption column 114 can be operated at pressure of about 100 kPa and the temperatures in the ranges of 90° C. to 135° C. Alternatively, the desorption column 114 can operate at a pressure in a range of 100 kPa to 250 kPa, with temperatures in the ranges of 90° C. to 110° C. Specific examples operating pressures for the desorption column 114 can also include 40 kPa to 170 kPa with temperatures in the ranges of 90° C. to 110° C. Similarly, the exact pressure and temperature for operating the desorption column 114 can again depend on the exact composition of the chemical absorbent(s) used, the thermal stability of the chemical absorbent(s), and on the rich loading of the solvent. It is understood that two or more of each of the absorption column 112 and/or the desorption column 114 can be used in the $CO_2$ absorption system 102 depending on, among other things, the volume flow of gas that needs to be handled.

Examples of the absorption column 112 can include those configured as a trayed column, a packed bed, a spray column, a bubble column, or a sparged tower. The absorption column 112 can operate with respect to the first gas stream 104 and the chemical absorbent in either a concurrent, or preferably a counter current manner in order to exchange the $CO_2$ gas between the liquid and gas phases. So, for example, the first gas stream 104 can enter at the bottom of the absorption column 112 at inlet 116 via line 118, as illustrated, and counter-currently contact the chemical absorbent. Inside the absorption column 112 the $CO_2$ gas in the first gas stream 104 transfers from the gas phase to the chemical absorbent liquid phase. The amount of $CO_2$ gas transferred from the gas phase to the chemical absorbent liquid phase is a function of the number of trays or the height of packing available in the absorption column 112, the size and configuration of which for a given situation is within the skill of the art. The amount of $CO_2$ gas transferred from the gas phase to the chemical absorbent liquid phase is also a function of the absorbent concentration, of the liquid-to-gas ratio, and of the operating temperature and pressure.

The $CO_2$ enriched chemical absorbent is taken out via line 120 at the lower section of the absorption column 112 and sent to desorption column 114 of the $CO_2$ desorption system 110 for regeneration. Examples of the desorption column 114 can include those configured as a packed bed column, a tray column, a spray column or a bubble column. The $CO_2$ enriched chemical absorbent enters near the top of the desorption column 114 via line 122. As illustrated, the $CO_2$ desorption system 110 includes a reboiler 124 for introducing heat into the desorption column 114. The reboiler 124 helps to heat the $CO_2$-enriched chemical absorbent to release the absorbed $CO_2$ gas, thereby regenerating the chemical absorbent on its way through the desorption column 114.

The released $CO_2$ gas forms gas bubbles that move countercurrent to the chemical absorbent as they rise up to the top of the desorption column 114. The released $CO_2$ gas can be passed through a condenser 126 which helps to remove water and other compounds before the $CO_2$ gas exits the $CO_2$ desorption system 110 as a recovered $CO_2$ gas stream 128. The recovered $CO_2$ gas stream 128 contains a relatively high concentration of $CO_2$ gas. For example, the recovered $CO_2$ gas stream 128 may contain at least 95 vol. % $CO_2$ gas based on the total volume of the recovered $CO_2$ gas stream 128. The recovered $CO_2$ gas stream 128 can be used in one or more industrial processes or stored.

The regenerated chemical absorbent is removed via line 130 from a lower section of the desorption column 114. The chemical absorbent in line 130 can then pass through heat exchanger 132. Heat exchanger 132 allows for the heat in the chemical absorbent in line 130 to be passed to the $CO_2$ enriched chemical absorbent being taken out via line 120 at the lower section of the absorption column 112 before it is sent to desorption column 114 of the $CO_2$ desorption system 110. The chemical absorbent in line 130 having been cooled in heat exchanger 132 is then reintroduced in the upper section of the absorption column 112 via line 134 for use in a new cycle as chemical absorbent. Typically, stream 134 is cooled further first using a lean amine cooler, before entering the absorber column 112.

Referring again to the $CO_2$ absorption system 102, the first gas stream 104 enters the absorption column 112 of the $CO_2$ absorption system 102 at inlet 116. Depending on its composition, the first gas stream 104 can be used directly as received from its source (i.e., the effluent gas directly from an industrial process). Alternatively, the first gas steam 104 is derived from an effluent gas that has undergone an effluent gas treatment process 136, which includes one or more of a series of chemical processes and/or scrubbers to remove or reduce the volume percent of one or more components of the effluent gas. For example, the first gas stream 104 can include solid particles (e.g., dust particles and/or soot particles), where the effluent gas treatment process 136 can include electrostatic precipitators, cyclones and/or fabric filters to remove at least a portion of the solid particles from the first gas stream 104 before capturing the $CO_2$ gas from the first gas stream 104 in the $CO_2$ absorption system 102.

In addition, the effluent gas treatment process 136 can be operated to capture at least one additional substance, in a gas phase, from the first gas stream 104 before capturing the $CO_2$ gas in the $CO_2$ absorption system 102. Examples of such additional substances include those having a moiety selected from the group of an amine, a sulfur compound, a phosphate and a cyanide. So, for example, the effluent gas treatment process 136 can include effluent-gas desulfurization to capture and remove $SO_x$ gases (e.g., $SO_2$ gas and $SO_3$ gas). Nitrogen oxides in the effluent gases, if present, can be treated in the effluent gas treatment process 136 by high temperature or catalytic reactions with ammonia or urea to convert the $NO_x$ gases to $N_2$ gas. Hydrogen sulfide, if present, can be removed using an amine or caustic scrubbing process, as is known. Cyanides can be converted in amines ($NH_3$) by hydrolysis and subsequently removed in an absorption step. Caustic solutions (e.g., sodium hydroxide solutions) can also be used to help remove cyanides from the first gas stream 104. Other components of the effluent gas, such as mercury, arsenic or other metals if present, can be removed from the effluent gas during the effluent gas treatment process 136, for example, by adsorption on sorbents or by capture in inert solids as part of the effluent-gas desulfurization product. The selection of processes to include in the effluent gas treatment process 136 can be based at least partially on the type and composition of the effluent gas as received from the industrial process and on the desired composition of the first gas stream 104, as discussed herein. For specific additional compounds in the effluent gas, removal is also achieved by exposure of the effluent gas to the chemicals present in the absorber system. Absorption of these, however, might impact the operating efficiency of the absorber system.

Preferably, the first gas stream 104 has at least 20 volume percent (vol. %) of a combined amount of CO gas and $CO_2$ gas based on the total volume percent of the first gas stream 104. With respect to individual components, the first gas stream 104 includes 5 to 80 volume percent (vol. %) nitrogen ($N_2$) gas, 15 to 80 vol. % CO gas, 5 to 40 vol. % $CO_2$ gas and 1 to 60 vol. % hydrogen ($H_2$) gas. Preferably, the first gas stream 104 includes 5 to 60 vol. % $N_2$ gas, 15 to 50 vol. % CO gas, 5 to 35 vol. % $CO_2$ gas and 1 to 35 vol. % $H_2$ gas. Most preferably, the first gas stream 104 includes 5 to 50 vol. % $N_2$ gas, 15 to 35 vol. % CO gas, 5 to 25 vol. % $CO_2$ gas and 1 to 10 vol. % $H_2$ gas. The basis for the given vol. % values the first gas stream 104 is on the total volume of the first gas stream, where the vol. % values for the first gas stream 104 always total 100 vol. %. The first gas stream discussed herein may also include other components, where the volume percent for the first gas stream 104 will always sum to 100 vol. %. Examples of the other components can include, but are not limited to, gaseous methane, oxygen and argon, among other gasses that are found in the atmosphere.

In addition to the above identified volume percentages, it has been surprisingly found that certain molar ratios of CO gas to $CO_2$ gas allow for at least a minimum energy balance to be achieved between the energy produced in the Fischer-Tropsch reactor 108 and the energy required to operate the $CO_2$ desorption system 110. For example, by carefully balancing the energy produced in the Fischer-Tropsch reactor 108 and the energy required to operate the $CO_2$ desorption system 110 an energy-neutral or less energy intensive process can be obtained from the first gas stream 104 when the CO gas to $CO_2$ gas molar ratio is at least 0.5:1. Preferably, the composition of the first gas steam 104 has a mole ratio of the CO gas to the $CO_2$ gas (mole CO gas:mole $CO_2$ gas) from 0.5:1 to 10:1. More preferably, the first gas stream 104 can have a mole ratio of the CO gas to the $CO_2$ gas from 0.5:1 to 5:1. Most preferably, the first gas stream 104 can have a mole ratio of the CO gas to the $CO_2$ gas from 0.5:1 to 2.5:1.

The first gas stream 104 entering the $CO_2$ absorption system 102 can have a temperature in a range of 5° C. to 100° C. Preferably, the temperature of the first gas stream is in the range of 15° C. to 65° C. More preferably, the temperature of the first gas stream is in the range of 25° C. to 50° C. The first gas stream 104 entering the $CO_2$ absorption system 102 can have a pressure of in a range of 5 kPa to 8400 kPa. Preferably, the first gas stream 104 has a pressure of in a range of 500 kPa to 5000 kPa. More preferably, the first gas stream 104 has a pressure of in a range of 1500 kPa to 3000 kPa.

As illustrated in FIG. 1, the $CO_2$ desorption system 110 is connected to both the $CO_2$ absorption system 102 and the Fischer-Tropsch reactor 108. The Fischer-Tropsch reactor 108 is also connected to both a source of hydrogen ($H_2$) gas, via line 138, and to the $CO_2$ absorption system 102 to receive the second gas stream 106 at inlet 140. As discussed herein, the Fischer-Tropsch reactor 108 operates to catalytically produce hydrocarbons with the $H_2$ gas from the $H_2$ gas source (stream 138) and the CO gas and the $H_2$ gas in the second gas stream 106 via a Fischer-Tropsch reaction, wherein the Fischer-Tropsch reaction produces the hydrocarbons and heat (i.e., is exothermic). Preferably, producing hydrocarbons from the Fischer-Tropsch reaction includes producing $C_5$ to $C_{20}$ hydrocarbons, as discussed herein.

In general, the Fischer-Tropsch reactor 108 operates to allow the CO gas and the $H_2$ gas from the second gas stream 106 and the $H_2$ gas from the $H_2$ gas source (stream 138) to undergo a Fischer-Tropsch reaction so as to produce hydrocarbons in a series of exothermic reactions. As understood by one skilled in the art, the Fischer-Tropsch reaction is a series of reactions that, given the selected reactor design, operating conditions (e.g., CO:$H_2$ gas ratio, flow rate, reaction temperature and pressure), catalyst including support material and one or more promotors, among other factors, produces a mixture of hydrocarbons. In a preferred embodiment, with an appropriate selection on the Fischer-Tropsch catalyst and process conditions it is possible to produce hydrocarbons comprising at least 50% by weight of hydrocarbons with a carbon chain length between 5 or higher and 20 or lower, with a fraction of hydrocarbons having a carbon range of 21 or higher of less than 10% by weight, preferably of less than 5% by weight. These hydrocarbon products are preferably linear hydrocarbons such as n-alkanes and/or n-olefins. As appreciated by one skilled in the art, the choice of catalyst and process conditions can be used to optimize and/or tailor the desired product, such as to minimize the production of methane and to maximize the production of the $C_5$ to $C_{20}$ hydrocarbon fraction, and/or to maximize the linear/branched ratio.

The hydrogen mole concentration in the first gas stream is typically low in comparison to the CO mole concentration in this same stream resulting in a $H_2$ mole to CO mole ratio lower than 1:1. Methods to increase the $H_2$ mole to CO mole ratio are known to those skilled in the art. For example, a water gas shift reactor can be used to convert CO and $H_2O$ into $CO_2$ and $H_2$, thereby increasing the $H_2$ mole to CO mole ratio. Preferably, however, the hydrogen source is chosen to maximize the use of CO for the production of useful chemicals. This additional $H_2$ gas can be fed to the Fischer Tropsch reactor 108 as stream 138 to increase the $H_2$:CO ratio to the desired ratio for the Fischer Tropsch reaction.

The design of the Fischer-Tropsch reactor 108 can be selected from several reactor designs that include a multi-tubular fixed bed reactor, a fluidized bed reactor, a slurry reactor and a fluid-bed and circulating catalyst reactor. Depending on the reactor design, the Fischer-Tropsch reactor 108 can be operated at a temperature in the range of 150° C. to 500° C. Preferably, the operating temperature of the Fischer-Tropsch reactor 108 can be in the range of 150° C. to 300° C. Operating pressures for the Fischer-Tropsch reactor 108 can be from 100 kPa to 10000 kPa. Preferably, the operating pressure of the Fischer-Tropsch reactor 108 can be in the range of 1000 kPa to 5000 kPa. A variety of catalysts can be used for the Fischer-Tropsch process. Examples of suitable catalysts include, but are not limited to, cobalt, iron and/or ruthenium. Preferably, a cobalt catalyst is used. For example, suitable cobalt-based catalysts and processing conditions for selectively forming the $C_5$ to $C_{20}$ hydrocarbon fraction can be found in "Forming Normal Alkanes" (International Application Number PCT/US15/51189) filed Sep. 21, 2015 and in "Forming Light Hydrocarbons" (International Application Number PCT/US15/51234) filed Sep. 21, 2015, both of which are incorporated herein by reference in their entirety.

The catalyst can also include a support, such as silica, alumina, titania, and/or zeolites. Promoters can also be used with the catalyst, where examples of promoters include, but are not limited to potassium and copper compounds, as are known in the art. The selection of the promoter can be dependent on the selected catalyst and the hydrocarbons that are to be produced. In addition, the choice of operating temperature and pressure for the Fischer-Tropsch reaction are dependent upon a variety of factors, including the reactor design, the hydrocarbons that are to be produced, the catalyst and the catalyst loading values used in the Fischer-Tropsch reaction.

As discussed herein, the $CO_2$ absorption system 102 operates to absorb $CO_2$ gas from the first gas stream 104 using a chemical absorbent, thereby producing the second gas stream 106 having a higher concentration of CO gas and a lower concentration of $CO_2$ gas as compared to first gas stream 104. Preferably, the $CO_2$ absorption system 102 operates to recover at least 90 volume percent (vol. %) to 95 vol. % of the $CO_2$ gas present in the first gas stream 104. In other words, the choice of chemical absorbent(s), operating temperature and/or operating pressure for the $CO_2$ absorption system 102 can be selected so as to form the second gas stream 106 by removing at least 90 vol. % to 95 vol. % of the $CO_2$ gas from the first gas stream 104. Removing greater than 95 vol. % of the $CO_2$ gas from the first gas stream 104 is also possible.

Given that at least 90 vol. % to 95 vol. % of the $CO_2$ gas is removed from the first gas stream 104 in producing the second gas stream 106, the mole ratio of the CO gas to the $CO_2$ gas in the second gas stream 106 will be greater than the first gas stream 104. For example, the mole ratio of the CO gas to the $CO_2$ gas in the second gas stream 106 can be 5:1 to 200:1 (mole CO gas:mole $CO_2$ gas). Preferably, the mole ratio of the CO gas to the $CO_2$ gas in the second gas stream 106 can be 10:1 to 100:1 (mole CO gas:mole $CO_2$ gas).

Using $H_2$ gas supplied via line 138 and from the second gas stream 106 the Fischer-Tropsch process can be carried out in the Fischer-Tropsch reactor 108 with a mole $H_2$ gas:mole CO gas ratio of 0.1:1 to 10:1. Preferably, the $H_2$ gas and the CO gas 106 used to produce the hydrocarbons in the Fischer-Tropsch reaction are reacted in a molar ratio of $H_2$ gas to CO gas (mole $H_2$ gas:mole CO gas) in the range of 1:1 to 3:1. Gas hourly space velocities for the flow of the $H_2$ gas and the CO gas at the given mole ratios can range from 100 $hr^{-1}$ to 10000 $hr^{-1}$. In a particularly preferred example, the Fischer-Tropsch reactor operates with a cobalt catalyst at a temperature in a range of 200° C. to 260° C. and a pressure in a range of 1000 kPa to 5000 kPa with the $H_2$ gas and the CO gas in a molar ratio of $H_2$ gas to CO gas (mole $H_2$ gas:mole CO gas) in the range of 1:1 to 3:1. This particularly preferred example allows for the $H_2$ gas and the CO gas to produce $C_5$ to $C_{20}$ hydrocarbons from the Fischer-Tropsch reaction.

The $H_2$ gas supplied to the Fischer-Tropsch reactor 108 in the second gas stream 106 is from the $H_2$ gas present in the first gas stream 104. The $H_2$ gas supplied to the Fischer-Tropsch reactor 108 through line 138 can be from any number of hydrogen production processes. Examples of $H_2$ gas sources can include the coke oven gas from a steel manufacturing plant, the hydrogen by-product stream from a dehydrogenation plant, a steam cracking process, an oil refining process, or from a steam reforming process or an electrolysis process. The integrated system 100 can further include a $H_2$ gas cleaning process 142, whose selection will be dependent on the $H_2$ gas source, as is known in the art. Examples of steps in the $H_2$ gas cleaning process 142 can include, but are not limited to, one or more of a series of chemical processes and/or scrubbers to remove or reduce the volume percent of one or more components of the $H_2$ gas. For example, electrostatic precipitators, cyclones and/or fabric filters can be used to remove at least a portion of any solid particles present in the stream 138 of the $H_2$ gas. Other techniques, such as pressure swing adsorption, can be used to clean the stream 138 of $H_2$ gas as needed. So, for example, the $H_2$ gas treatment process 142 can include effluent-gas desulfurization to capture and remove S-containing contaminants. Hydrogen sulfide, if present, can be removed using an amine or caustic scrubbing process, as is known. Ammonia ($NH_3$) can be removed by a scrubbing process or an absorption process. Cyanides can be converted in amines ($NH_3$) by hydrolysis and subsequently removed in an absorption step. Caustic solutions (e.g., sodium hydroxide solutions) can also be used to help remove cyanides from the first gas stream 104. Other components of the effluent gas, such as metals if present, can be removed from the effluent gas during the effluent gas treatment process 142, for example, by adsorption on sorbents or by capture in inert solids as part of the effluent-gas desulfurization product. The selection of processes to include in the effluent gas treatment process 142 can be based at least partially on the type and composition of the effluent gas as received from the industrial process and on the desired composition of the first gas stream 104, as discussed herein. In a specific embodiment, the additional $H_2$ source gas can be co-fed with the first gas stream 104 to the clean-up section 136 and be fed to the Fischer Tropsch reactor 108 via the $CO_2$ absorption system 102. Additional $H_2$ gas from another source can still needed to be fed to the Fischer Tropsch reactor 108 as stream 138 to achieve the desired $H_2$:CO gas ratio to perform the Fischer Tropsch reaction.

The output of Fischer-Tropsch reactor 108 is sent to a separations unit 144, where the hydrocarbons produced from the Fischer-Tropsch reaction are separated from CO gas, $H_2$ gas, $CO_2$ gas and water vapor, among other gases. The separations unit 144 can be, among other options, a conventional gas-liquid separator that applies the principle of condensation to separate the condensed products from the gaseous products at decreased temperature.

In a specific embodiment, the liquid products from the separations unit 144 can be, if desired, further processed to tailor the products to the desired specifications. Such unit operations could include, if desired, catalytic conversions like (hydro) cracking and/or hydro deoxygenation to crack and/or isomerizes products and to remove oxygenated compounds that are sometimes formed in the Fischer-Tropsch reaction.

Optionally, a $CO_2$ containing gas coming from the Fischer-Tropsch reactor 108 and separated in the separations unit 144 can be supplied to the inlet 116 of the $CO_2$ absorption system 102 through line 146 for capture with the chemical absorbent. In addition, line 147 can be used to return at least a part of the CO gas and $H_2$ gas remaining after the Fischer-Tropsch reaction back to the Fischer-Tropsch reactor 108. As illustrated, line 147 can join the second gas stream 106 before entering the Fischer-Tropsch reactor 108.

The Fischer-Tropsch reactor 108 can further include a heat exchanger 148 to capture at least a portion of the heat generated during the Fischer-Tropsch reaction. The heat exchanger 148 can include, among other designs, a shell and tube heat exchanger configured into the design of the Fischer-Tropsch reactor 108. Cooling fluid passing through the heat exchanger 148 absorbs the heat produced during the Fischer-Tropsch reaction to help maintain the reaction conditions inside the Fischer-Tropsch reactor 108. The cooling fluid used in the heat exchanger 148 can include water, among other known cooling fluids.

As illustrated in FIG. 1, the $CO_2$ desorption system 110 is connected to the heat exchanger 148. Specifically, the reboiler 124 of the $CO_2$ desorption system 110 is connected to the heat exchanger 148 through line 150. The cooling fluid used in the heat exchanger 148 absorbs the heat produced during the Fischer-Tropsch reaction, where this cooling fluid is then supplied through line 150 to the reboiler 124 of the $CO_2$ desorption system 110 so that at least a portion of the heat produced in the Fischer-Tropsch reaction and captured by the heat exchanger 148 can then be used to thermally regenerate the chemical absorbent in the desorption system 110 to liberate the $CO_2$ gas captured from the first gas stream.

As seen in FIG. 1, the cooling fluid coming from the heat exchanger 148 after absorbing the heat produced during the Fischer-Tropsch reaction enters the reboiler 124 at inlet 152, where the reboiler 124 transfers this heat in the cooling fluid coming from the heat exchanger 148 to the $CO_2$-enriched chemical absorbent in the desorption column 114. As discussed herein, the heat then allows the release of the absorbed $CO_2$ gas from the $CO_2$-enriched chemical absorbent, thereby regenerating the chemical absorbent on its way through the desorption column 114.

Figure 2:
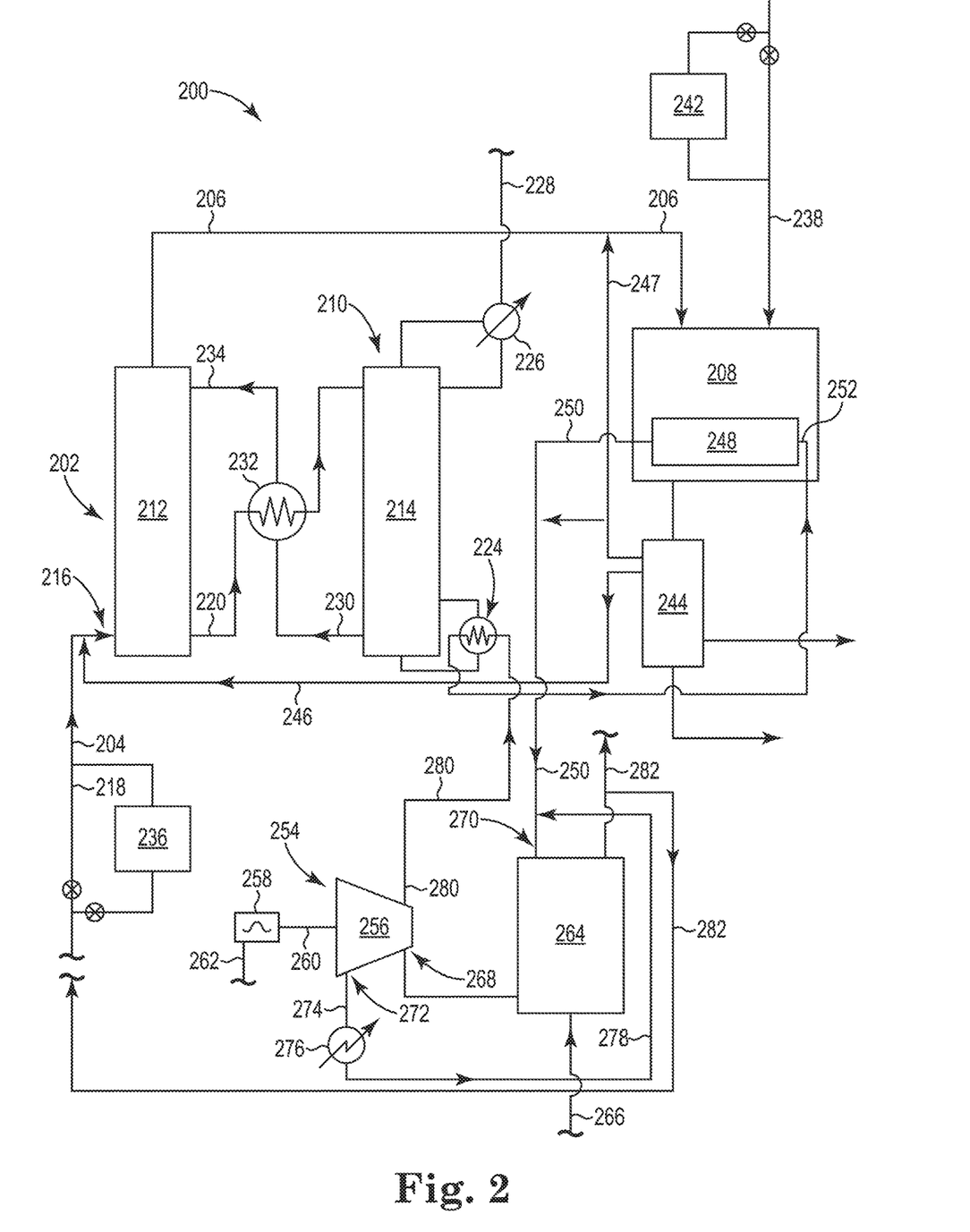
FIG. 2 provides an illustration of an integrated system according to the present disclosure.

Referring now to FIG. 2, there is shown an additional embodiment of the integrated system 200 according to the present disclosure. As illustrated, the integrated system 200 includes the two major processes previously discussed in association with FIG. 1, where the two major processes are integrated in such a way to both capture $CO_2$ gas using a chemical absorbent and to thermally regenerate the chemical absorbent using heat captured in an exothermic process (e.g., a Fischer-Tropsch reaction) that converts the CO gas and $H_2$ gas into hydrocarbons. The discussion of the illustrated components in FIG. 1 will not be repeated here for brevity, but are shown in FIG. 2 and incorporated herein into the following discussion of FIG. 2.

FIG. 2 illustrates an embodiment of the present disclosure in which there occurs an energy "transfer" between three major processes. As previously discussed, the two major processes are integrated in such a way to both capture $CO_2$ gas using a chemical absorbent and to thermally regenerate the chemical absorbent using heat captured in an exothermic process (e.g., a Fischer-Tropsch reaction) that converts the CO gas and $H_2$ gas into hydrocarbons. FIG. 2 now integrates an electrical energy producing process (e.g., a steam-based electrical energy power plant) that preferably utilizes heat derived from the Fischer-Tropsch reaction to first pre-heat the boiler feed water to the electrical energy producing process. This allows the electrical energy producing process to reduce its fuel usage while retaining the same electrical energy output.

As illustrated in FIG. 2, the integrated system 200 includes an electrical energy producing process 254. A variety of electrical energy producing processes is known and the following is just one example thereof. It is appreciated that other known components could be substituted and/or added to the electrical energy producing process 254 without changing the general understanding of the present disclosure.

The electrical energy producing process 254 includes, among other things known in the art, a steam turbine 256, an electrical generator 258 mechanically coupled to the steam turbine 256 via shaft 260 to allow for the mechanical energy from the steam turbine 256 to be converted into electrical energy, which can be delivered to an external circuit by electrical line 262. A furnace 264 heats boiler feed water to produce high pressure steam that powers the steam turbine 256. The furnace 264 can operate using a fuel such as, for example, coal, fuel oil, natural gas or shale oil delivered through line 266. The high pressure steam produced by the furnace 264 is provided to the steam turbine 256 at inlet 268, where the high pressure steam provides work to rotate the shaft 260.

To connect this third process to the two previously discussed processes, the heat exchanger 248 associated with the Fischer-Tropsch reactor 208 is connected with the electrical energy producing process 254. Specifically, the furnace 264 of the electrical energy producing process 254 is connected to the heat exchanger 248 through line 250. The heat exchange fluid (e.g. hot water condensate) in line 250 after being heated in the heat exchanger 248 is pumped to the inlet 270 of the furnace 264. Here, the heat exchange fluid can enter the furnace 264 as a part of the boiler feed water. Alternatively, a heat exchanger could be used to transfer the heat from the heat exchange fluid from the heat exchanger 248 associated with the Fischer-Tropsch reactor 208 to first pre-heat the boiler feed water. Effluent gas 282 produced by the furnace 256 can be recycled back to join the first gas stream 204 of the $CO_2$ absorption system 202.

So, the heat produced and captured by the heat exchanger 248 in the Fischer-Tropsch reactor 208 during the Fischer-Tropsch reaction is first used to generate electricity. This allows heat exchange fluid coming from the heat exchanger 248 of the Fischer-Tropsch reactor 208 to first be used at a high energy potential in the electrical energy producing process 254. The waste heat remaining after generating electricity is then, as will be discussed herein, used as the portion of the heat produced during the Fischer-Tropsch reaction to thermally regenerate the chemical absorbent in the $CO_2$ desorption system 210 of the integrated system 200. In doing this, it is calculated that efficiency of the electrical energy producing process may be increased from about 40% to about 50% with an associated $CO_2$ reduction of 1.1 kT/y per MW power generated or 3.7 T $CO_2$/T product produced.

As illustrated, the steam turbine 256 has outlets for steam, where the position of the outlets are configured for specific purposes. As illustrated, an exhaust steam outlet 272 leaves the steam turbine 256 to provide the exhaust steam in line 274 to a condenser 276, which condenses and returns the condensate to the inlet 270 of the furnace 264 via line 278 to be regenerated into high pressure steam. The steam turbine 256 is also fitted with a side extraction outlet 280 that provides steam at a temperature and a pressure suitable for use in the reboiler 224 of the desorption column 214 to heat the $CO_2$-enriched chemical absorbent to release the absorbed $CO_2$ gas, thereby regenerating the chemical absorbent on its way through the desorption column 214. The condensate from the reboiler 224 can then be returned to the inlet 252 of the heat exchanger 248. As discussed herein, this allows what would normally become waste heat from the steam turbine 256 to now be used in regenerating the chemical absorbent used to capture $CO_2$ gas, which would have otherwise gone into the atmosphere. This configuration, therefore, provides for an improved hierarchy of energy usage, where not only is the heat produced in the Fischer-Tropsch reactor 208 first used to help generate electricity, but is also used to regenerate the chemical absorbent used to capture $CO_2$ gas. This effectively doubles the use and, therefore, doubles the value of the heat produced in the Fischer-Tropsch reactor 208. Consequently, energy is saved (on-purpose energy production is an additional source of $CO_2$ emission) and $CO_2$ gas is captured.

The processes of the integrated systems 100 and/or 200 discussed herein can be operated in batch processes, semi-continuous process or in continuous process operations. Preferably, the processes of the integrated systems 100 and/or 200 discussed herein are operated in continuous process operations.

What is claimed is:

1. A method, comprising:
    capturing carbon dioxide ($CO_2$) gas from a first gas stream with a chemical absorbent, wherein the first gas stream includes carbon monoxide (CO) gas and $CO_2$ gas, to produce a second gas stream having a higher concentration of CO gas and a lower concentration of $CO_2$ gas as compared to first gas stream, wherein the first gas stream has a mole ratio of the CO gas to the $CO_2$ gas (mole CO gas: mole $CO_2$ gas) from 0.5:1 to 10:1;
    producing hydrocarbons with hydrogen ($H_2$) gas and the CO gas in the second gas stream from a Fischer-Tropsch reaction, wherein the Fischer-Tropsch reaction produces heat;
    generating electricity with the heat produced during the Fischer-Tropsch reaction, and
    using waste heat from generating the electricity to pre-heat a reboiler in a desorption system to regenerate the chemical absorbent by liberation of the $CO_2$ gas captured from the first gas stream.

2. The method of claim 1, wherein the first gas stream has at least 20 volume percent (vol. %) of a combined amount of CO gas and $CO_2$ gas based on the total volume percent of the first gas stream.

3. The method of claim 1, wherein the first gas stream has a mole ratio of the CO gas to the $CO_2$ gas (mole CO gas:mole $CO_2$ gas) of 0.5:1 to 2.5:1.

4. The method of claim 1, wherein capturing $CO_2$ gas from the first gas stream further includes capturing at least one additional substance in a gas phase, wherein the substance has a moiety selected from the group of an amine, a sulfur, a phosphate and a cyanide.

5. The method of claim 1, wherein producing hydrocarbons from the Fischer-Tropsch reaction includes producing $C_5$ to $C_{20}$ hydrocarbons.

6. The method of claim 5, wherein the $H_2$ gas and the CO gas in the second gas stream used to produce the $C_5$ to $C_{20}$ hydrocarbons from the Fischer-Tropsch reaction are reacted in a molar ratio of $H_2$ gas to CO gas (mole $H_2$ gas:mole CO gas) in the range of 1:1 to 3:1.

7. The method of claim 6, further including returning at least a part of the CO gas and $H_2$ gas remaining after the Fischer-Tropsch reaction to the second gas stream.

8. An integrated system, comprising:
    a $CO_2$ absorption system including an adsorption column having an inlet for a first gas stream having at least CO gas and $CO_2$ gas present in a mole ratio of mole CO gas:mole $CO_2$ gas from 0.5:1 to 10:1, and wherein the adsorption column of the $CO_2$ absorption system captures $CO_2$ gas from the first gas stream with a chemical absorbent to produce a second gas stream having higher concentration of CO gas and a lower concentration of $CO_2$ gas as compared to first gas stream;

a Fischer-Tropsch reactor connected to a source of hydrogen ($H_2$) gas and to the $CO_2$ absorption system to receive the second gas stream, wherein the Fischer-Tropsch reactor operates to catalytically produce hydrocarbons from a Fischer-Tropsch reaction with the $H_2$ gas and the CO gas from the second gas stream, wherein the Fischer-Tropsch reaction produces heat;

a heat exchanger connected to the Fischer-Tropsch reactor to capture heat produced during the Fischer-Tropsch reaction;

a $CO_2$ desorption system including a reboiler and a desorption column, the $CO_2$ desorption system being connected to both the $CO_2$ absorption system and the heat exchanger, wherein the heat captured by the heat exchanger of the Fischer-Tropsch reactor is first used in generating electricity, and wherein waste heat remaining after generating the electricity is used to thermally regenerate the chemical absorbent in the desorption column of the $CO_2$ desorption system to liberate the captured $CO_2$ gas; and an electrical production system including a furnace and a generator coupled to a steam turbine, wherein the furnace is coupled to the heat exchanger of the Fischer-Tropsch reactor, wherein the heat exchanger of the Fischer-Tropsch reactor is configured to first use the heat captured in generating electricity via the electrical production system, wherein the heat exchanger is further configured to use waste heat remaining after generating the electricity to thermally regenerate the chemical absorbent in the desorption column of the $CO_2$ desorption system by preheating the reboiler in the desorption system.

9. The integrated system of claim 8, wherein the first gas stream has at least 20 volume percent (vol. %) of a combined amount of CO gas and $CO_2$ gas based on the total volume percent of the first gas stream.

10. The integrated system of claim 8, wherein the first gas stream includes 5 to 60 volume percent (vol. %) nitrogen gas, 15 to 50 vol. % CO gas, 5 to 35 vol. % $CO_2$ gas and 1 to 35 vol. % hydrogen gas.

11. The integrated system of claim 8, wherein the first gas stream has a mole ratio of the CO gas to the $CO_2$ gas (mole CO gas:mole $CO_2$ gas) of 0.5:1 to 2.5:1.

12. The integrated system of claim 8, wherein the $H_2$ gas and the CO gas in the second gas stream used to produce the hydrocarbons in the Fischer-Tropsch reaction are reacted in a molar ratio of $H_2$ gas to CO gas (mole $H_2$ gas:mole CO gas) in the range of 1:1 to 3:1.

13. The integrated system of claim 8, wherein the Fischer-Tropsch reactor operates with a cobalt-catalyst at a temperature in a range of 200° C. to 260° C. and a pressure in a range of 1000 kPa to 5000 kPa.

14. The integrated system of claim 8, wherein the Fischer-Tropsch reaction produces $C_5$ to $C_{20}$ hydrocarbons.

15. The integrated system of claim 8, wherein $CO_2$ gas from the Fischer-Tropsch reactor is supplied to the inlet of the $CO_2$ absorption system.

16. The integrated system of claim 8, wherein at least part of the CO gas and $H_2$ gas from the Fischer-Tropsch reactor is returned to the Fischer-Tropsch reactor.

17. The integrated system of claim 8, wherein the first gas stream further comprises an effluent gas stream including a flue gas, an exhaust gas, a discharge gas, a process gas from an industrial process, or combinations thereof.

18. The integrated system of claim 8, wherein the first gas stream further comprises an effluent gas stream from a steel making industrial process.

* * * * *